United States Patent [19]

Highby

[11] Patent Number: 4,516,351
[45] Date of Patent: May 14, 1985

[54] CASTING ROD AND HANDLE ASSEMBLY
[75] Inventor: Dennis N. Highby, Sidney, Nebr.
[73] Assignee: Cabela's Inc., Sidney, Nebr.
[21] Appl. No.: 446,966
[22] Filed: Dec. 6, 1982
[51] Int. Cl.³ .................... A01K 87/00; A01K 87/06
[52] U.S. Cl. ......................................... 43/23; 43/22; 43/18.1
[58] Field of Search .............. 43/20, 18.1, 18.2, 22, 43/23

[56] References Cited
U.S. PATENT DOCUMENTS

| | | | |
|---|---|---|---|
| 2,597,738 | 5/1952 | Koos | 43/23 |
| 2,667,713 | 2/1954 | Stephens | 43/23 |
| 2,795,073 | 6/1957 | Gronewold | 43/23 |
| 3,426,466 | 2/1969 | Shepherd | 43/23 |
| 4,077,150 | 3/1978 | Barnes | 43/23 |
| 4,398,369 | 8/1983 | Wiebe | 43/23 |
| 4,403,439 | 9/1983 | Wallace | 43/23 |
| 4,463,512 | 8/1984 | McCreery | 43/22 |

Primary Examiner—Nicholas P. Godici
Assistant Examiner—Kurt Rowan
Attorney, Agent, or Firm—Fields, Lewis, Pittenger & Rost

[57] ABSTRACT

The casting rod and handle assembly disclosed has greater sensitivity to a fish striking and on the fish line associated with the rod. The assembly includes a rod blank (45) extending entirely through a handle body (12) and through a hand grip (38), preferably of the offset period grip type. An upper exposed rod portion (51) in the reel seat (15) of the handle body is provided for contacting the reel and a lower exposed rod portion (52) opposite the reel seat is effective to transmit rod vibrations to the hand of a user gripping the hand grip.

2 Claims, 6 Drawing Figures

CASTING ROD AND HANDLE ASSEMBLY

TECHNICAL FIELD

This invention relates generally to fishing rods and more particularly to a novel and improved rod and handle assembly.

BACKGROUND ART

Casting rods presently in use have the rod blank affixed to only the front end portion of the handle body. The rod blank has heretofore been extended through the handle body in spinning rods but the handle bodies of casting rods and spinning rods differ considerably and no casting rods have been provided with exposed rod portions for direct contact with the reel base or the finger of the user for increased sensitivity to a fish on the line.

DISCLOSURE OF INVENTION

A casting rod and handle assembly is disclosed wherein a rod blank extends through and is in direct contact with the entire length of the handle body and substantially the entire length of the hand grip. The rod blank has an upper exposed rod portion in the reel seat for contacting the base of a reel mounted on the handle body and a lower exposed rod portion below the reel seat for contacting the finger of the user to provide greater sensitivity to the presence of a fish on a line strung through the rod blank.

BRIEF DESCRIPTION OF DRAWINGS

The details of this invention will be described in connection with the accompanying drawings, in which.

DETAILED DESCRIPTION

Figure 1:
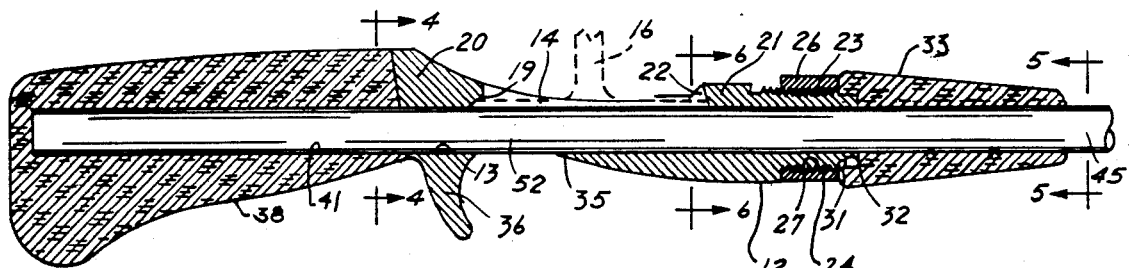
FIG. 1 is a side elevation of a rod and handle assembly embodying features of the present invention, with portions broken away along a vertical sectional line to show interior construction.
Figure 2:
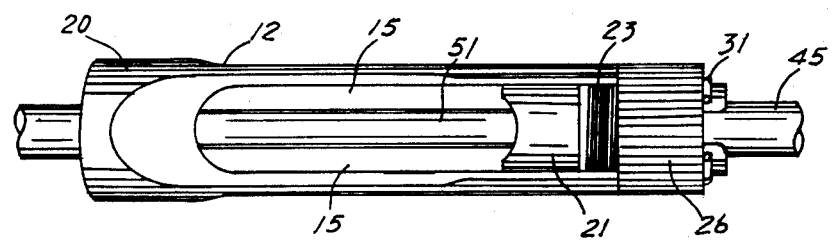
FIG. 2 is a top plan view of the rod and handle assembly shown in FIG. 1.
Figure 3:
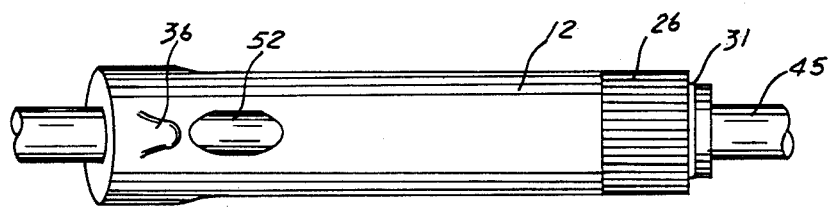
FIG. 3 is a bottom plan view of the rod and handle assembly of FIG. 1.
Figure 4:
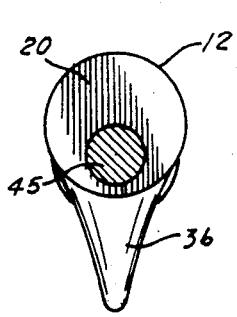
FIG. 4 is a sectional view taken along lines 4—4 of FIG. 1.
Figure 5:
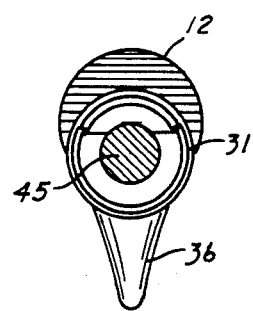
FIG. 5 is a sectional view taken along lines 5—5 of FIG. 1.
Figure 6:
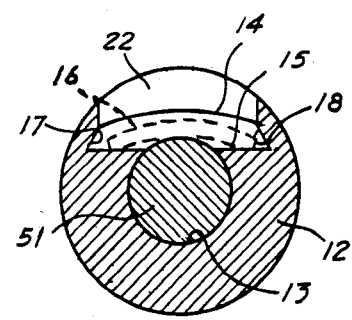
FIG. 6 is an enlarged sectional view taken along lines 6—6 of FIG. 1.

The rod and handle assembly shown in FIGS. 1-6 has a one-piece handle body 12 that is generally cylindrical in shape and has a generally circular transverse cross section. The handle body 12 has a longitudinal throughbore 13 extending through the longitudinal centerline thereof to enter at the center at the front end and closer to the bottom at an upwardly offset, circular, rear end portion 20, as seen in FIGS. 4 and 5.

A top recess or recessed area 14 is formed in the handle body 12 that is sized to receive the reel base 16 so that the handle body provides a flat top reel seat 15 for supporting the reel base 16. The top recess 14 is channel-like in shape, being further defined by opposed inwardly and upwardly inclined side-wall portions 17 and 18 which provide a retaining guideway for the clamp described hereinafter, together with a forwardly and upwardly inclined rear wall portion 19 for retaining the reel base 16 on the handle body. A preferred construction for the handle body 12 is a molded one-piece unitary member comprised of a blend of nylon, fiberglass, and graphite.

A slidable reel clamp 21 is mounted in the top recess 14 and has a rearwardly and upwardly inclined front wall portion 22 opposite wall portion 19 for engaging and holding down the front end portion of the reel base. This clamp 21 has a front end portion with opposed generally V-shaped side edges complementary in shape to be slidably guided in and retained in sidewall portions 17 and 18. Clamp 21 further has an externally threaded rear end portion 23 that is narrower than the front end portion of the clamp.

The front end portion of the handle body 12 has an externally threaded portion 24 on which an annulus or ring 26 with internal threads 27 is threadably mounted whereby, upon threading the ring 26 on threaded portions 23 and 24, the reel clamp 21 is advanced rearwardly or forwardly to tighten or loosen, respectively, the reel base in the reel seat on the handle body. A metal snap ring 31 in an annular recess 32 in the front end of the handle body holds the ring 26 and clamp 21 in place on the reel seat. A front ferrule 33, typically of cork, is mounted forwardly of the handle body and covers the snap ring 31.

The top recess 14 opens into a portion of the throughbore and a bottom recess 35 opposite the reel seat opens into a portion of the throughbore. An integral trigger portion 36 is provided at the rear of the handle body rearwardly of the bottom recess that projects down therefrom. A hand grip 38 extends rearwardly from the rear end of the handle body and has a bore 41 that is alined with the throughbore 13. The grip bore 41 extends substantially to the rear end of the hand grip. The hand grip 38 and trigger portion 36 are of the offset pistol grip type with the hand grip being offset downwardly at an angle to the throughbore in the handle body.

A rod or rod blank 45 of the casting type extends entirely through the throughbore and through the hand grip bore to substantially the rear end thereof. Rod 45 includes an upper exposed rod portion 51 that projects above the top reel base seating surface portions and extends substantially the full length of the reel seat 15 to form an intermediate reel base seating surface portion for contacting the reel base 16 to transmit vibrations produced by a fish on the line strung from the rod to the hand of the user via the reel. Rod 45 further includes a lower exposed rod portion 52 opposite the reel seat 15 in the bottom recess to transmit rod vibrations caused by the fish to a finger of the user gripping the hand grip when the finger is on the trigger portion and against the lower exposed rod portion 52.

The arrangement of having the rod extend entirely through the handle body and the grip, as well as having the top and bottom exposed rod portions, has been found to provide a strong connection between the handle body and grip and the rod and to greatly increase the sensitivity of the rod when a fish is on the line, as compared to a casting rod wherein the rod is merely affixed to the front end of the handle body.

Although the present invention has been described with a certain degree of particularity, it is understood that the present disclosure has been made by way of example and that changes in details of structure may be made without departing from the spirit thereof.

What is claimed is:

1. A pistol grip type casting rod handle assembly in combination with a casting-type rod blank having reduced weight, improved sensitivity and improved balance comprising:

a handle body having a throughbore defined by interior surfaces extending through substantially a full circle and a unitary rod blank of the casting type extending through said throughbore in direct contact with and connected to said interior surfaces to reinforce and strengthen said handle body and improve sensitivity, said rod blank being continuous and unbroken in its extension through the handle body extending beyond the rear end of said handle body, said handle body having a recessed surface along a line disposed inwardly of the periphery of said rod blank defining a reel seat on which a reel base is supported to bring the reel base in close proximity to the axis of the rod blank for providing improved reel balance on the rod, said reel seat having a top opening provided by having said throughbore extend into said reel seat and a first exposed rod blank portion in said top opening that projects above said reel seat for contacting the base of the reel whereby to receive rod blank vibrations that are transmitted through said rod blank to a reel carried by said reel seat and into the hand of the user, said handle body having a bottom opening and a second exposed rod blank portion in said bottom opening projecting out of said bottom opening whereby to receive rod blank vibrations that are transmitted through said rod blank directly to the finger of the user, said body having a forward end portion with a forward bore section arranged concentric with the center of said forward end portion, said body having a rear end portion upwardly offset from said front end portion with a rear bore section offset below the center of said rear end portion, said rear bore section defined by interior surfaces in contact with and connected to said rod blank with said rear end portion fully surrounding said rod blank at said rear end, said body having a trigger portion, said recessed surface, forward end portion, rear end portion, and trigger portion being formed as a one-piece member, said member being secured to said rod blank for transmitting rod blank vibrations to said reel seat; and an offset hand grip extending rearwardly of said handle body and extending downwardly at an angle to said rod blank, said grip having a grip bore alined with said throughbore and extending from a front end of said grip to the rear of said grip, said grip fully covering said rod blank, said rod blank being secured to said grip to provide an offset pistol grip type assembly for proper grip angle and casting comfort.

2. A pistol grip type casting rod handle assembly as set forth in claim 1 including a slidable reel clamp having oppositely disposed side edge portions retained in and guided for movement along said reel seat, said clamp being advanced and retracted along said first recess by a ring with internal threads threading on external threads on said forward end portion of said handle body and external threads on a front end portion of said clamp and further including a retaining member to hold said ring on said handle body.

* * * * *